United States Patent Office 3,433,691
Patented Mar. 18, 1969

3,433,691
BORATED DEXTRIN-SILICATE ADHESIVES
William D. Reese, Perry, Ohio, assignor to Diamond Shamrock Corporation, Cleveland, Ohio, a corporation of Delaware
No Drawing. Continuation-in-part of application Ser. No. 386,424, July 30, 1964. This application Apr. 3, 1968, Ser. No. 724,674
U.S. Cl. 156—195                5 Claims
Int. Cl. C09j; B31c 3/00, 1/02

ABSTRACT OF THE DISCLOSURE

An adhesive composition useful in the manufacture of laminated paper goods consists essentially of a mixture of 80–90% of an aqueous alkali metal silicate, 4–10% borated dextrin and the balance water.

---

Background of the invention

This application is a continuation in part of my copending application U.S. Ser. No. 386,424, filed July 30, 1964, and now abandoned.

Aqueous alkali metal silicates, particularly sodium silicates, have for years been used as adhesives for pasteboard and boxboard to be used in cartons and the like, as well as in other fields such as plywood manufacture. They are extremely versatile adhesives, combining convenience of use with strength and rigidity. However, their use has been largely restricted to areas where the color and appearance of the product is immaterial from a selling standpoint, since silicates cause staining and discoloration of paper.

The problem of discoloration is particularly acute in the manufacture of laminated paper tubes, since the purchasers of these tubes prefer a substantially colorless or light-colored article. Accordingly, makers of paper tubes have shied away from the use of silicates in favor of dextrin adhesives, which do not cause discoloration. Dextrin adhesives, however, cannot be used to prepare rigid tubes, and rigidity is a desired characteristic.

In the course of trying to develop satisfactory adhesives for a number of purposes, investigators have developed various additives for use in silicate adhesives and combinations of several types of adhesive compositions. Silicate-dextrin combinations have several advantages but fail to solve the problem of staining. Starch and borated starch have been combined with silicates, but the product "sets up" much too rapidly for ordinary use and a constant viscosity is very difficult to maintain. Thus, the search for an adhesive which combines the properties of rigidity, proper curing time and non-staining characteristics has continued.

Statement of the invention

A principal object of this invention, therefore, is to provide a non-staining silicate adhesive for use in manufacturing paper goods where the color of the product is an important factor.

A further object is to provide an adhesive which is non-staining, has a convenient curing time, and affords a structurally rigid product.

Still another object is to provide a basic adhesive composition with desirable properties to which can be added one or more specialized additives to provide additional advantages and increase the versatility of said composition.

Other objects and advantages will in part be obvious and will in part appear hereinafter.

The basic adhesive composition of this invention consists essentially of 80–90% (by weight) aqueous alkali metal silicate containing about 35–45% solids and having a silica to alkali metal oxide weight ratio between about 2.5:1 and 4.0:1; 4–10% borated dextrin; and the balance water. Other ingredients may be included as modifiers, as described below.

Description of the preferred embodiments

The alkali metal silicate used in the composition of this invention is preferably an aqueous sodium silicate (water glass). Its solids content is desirably about 35–45%, and the weight ratio of silica to sodium oxide may be between 2.5:1 and 4.0:1, preferably between 3.0:1 and 3.5:1. If desired, a hydrated dry silicate may be mixed with dry borated dextrin and water may then be added in the requisite amount; however, it is usually more convenient to start with an aqueous solution of silicate.

Typical sodium silicates which may be used include those listed in the following table and manufactured by the Diamond Shamrock Corporation.

| Silicate grade | Na$_2$O | SiO$_2$ | Solids content, percent | SiO$_2$:Na$_2$O wt. ratio | Gravity, °Bé. | Viscosity stormer, sec. |
|---|---|---|---|---|---|---|
| 33 | 8.8 | 29.1 | 37.9 | 3.30 | 41.0 | 110 |
| 40 | 9.1 | 29.2 | 38.3 | 3.22 | 41.5 | 75 |
| 42 | 9.3 | 30.0 | 39.3 | 3.22 | 42.5 | 140 |
| 42 water, white | 10.6 | 26.9 | 37.5 | 2.54 | 42.0 | 23 |
| JW-25 | 10.6 | 26.9 | 37.5 | 2.54 | 42.0 | 23 |
| 49-F G | 12.4 | 32.1 | 44.5 | 2.58 | 49.0 | 230 |

The borated dextrin which is the second major ingredient of the composition of this invention has a borax content of from about 1 to 30%, by weight, and is formed, for example, by adding from 1 to 30%, on a dextrin basis, of an alkali metal borate to an aqueous dispersion of dextrin. Suitable methods for its preparation are disclosed, for example, in U.S. Patents 604,584 and 2,849,327. Dextrin, or dextrine, is a colloidal mixture formed by the hydrolysis of starch.

Other ingredients known to those skilled in the art, such as clays and urea additives, may be added to the adhesive composition to provide the desired curing time, viscosity and storage life. It may also be advantageous to include a small amount of wetting agent in the silicate solution.

The proportions of silicate and borated dextrin in the adhesives of this invention are quite critical; and appreciable deviation from the percentages indicated (80–90% silicate and 4–10% borated dextrin) introduces undesirable properties and renders the adhesive unsuitable for use in paper tubes.

In the manufacture of tubes containing the adhesive composition of this invention, a continuous strip of paper is passed over a glue roll to apply the adhesive and the coated paper is then wound on a mandrel. Two kinds of tubing are possible, depending on the manner in which the paper is cut and wound. In the manufacture of convolute tubes, the adhesive-coated paper is wound upon itself continuously like a roll of toilet tissue until the desired tube wall thickness is attained; the width of the finished tube is the same as that of the paper. Spiral tubes are produced by gluing several narrow ribbons of paper together to produce the desired wall thickness and then winding the laminate thus formed around the mandrel in a helical configuration. The number of helical turns governs the tube length. While the adhesive of this invention may advantageously be used in tubes of either kind, it has been found particularly useful in the production of convolute tubes.

The adhesives of this invention are a distinct improvement over those of the prior art in that they combine the desirable properties of good viscosity, short curing time (about eight hours as compared with 24 hours for straight dextrin adhesives) and non-staining of paper. Furthermore, their use in the production of laminated paper tubes results in a structurally rigid product.

EXAMPLE

The following recipe is a preferred example of the adhesive compositions of this invention.

|  | Grams |
|---|---|
| Grade 33 silicate (an aqueous sodium silicate with a $SiO_2:Na_2O$ weight ratio of 3.3:1 and a solids content of about 37.9%) | 83.5 |
| Borated dextrin (containing about 13% by weight borax) | 9.1 |
| Water | 7.4 |

It is to be understood that the invention is not limited by the specific example and embodiments described hereinabove, but includes such changes and modifications as may be apparent to one skilled in the art upon reading the appended claims.

I claim:

1. An adhesive composition consisting essentially of 80–90% (by weight) aqueous alkali metal silicate containing about 35–45% solids and having a silica to alkali metal oxide weight ratio between about 2.5:1 and 4.0:1; 4–10% borated dextrin containing about 1 to 30% by weight borax; and water.

2. The composition of claim 1 wherein the alkali metal silicate is sodium silicate.

3. The composition of claim 2 wherein the sodium silicate has a silica to sodium oxide weight ratio between about 3.0:1 and 3.5:1.

4. An adhesive composition consisting essentially of about 83.5% (by weight) aqueous sodium silicate containing about 37.9% solids and having a silica to sodium oxide weight ratio of about 3.3:1; about 9.1% borated dextrin containing about 13% by weight borax; and the balance water.

5. A method of forming a rigid, non-stained, laminated paper product which method comprises applying to a strip of paper to be laminated a coating of an adhesive which consists essentially of a mixture of from 80–90% (by weight) of an aqueous alkali metal silicate having a silica to alkali metal oxide weight ratio between about 2.5:1 and 4.0:1, 4–10% (by weight) borated dextrin containing about 1 to 30% by weight borax and the balance water; winding the thus coated paper to form the desired laminated paper product and allowing the adhesive to set.

References Cited

UNITED STATES PATENTS

| 845,791 | 3/1907 | Isaacs | 106—74 |
| 1,337,381 | 4/1920 | Alexander | 106—74 |
| 2,772,996 | 12/1956 | Sams | 106—80 |
| 2,849,327 | 8/1958 | Ryan | 106—208 |

FOREIGN PATENTS

| 20,528 | 12/1900 | Great Britain. |
| 120,471 | 11/1918 | Great Britain. |

TOBIAS E. LEVOW, *Primary Examiner.*

SAMUEL E. MOTT, *Assistant Examiner.*

U.S. Cl. X.R.

106—80, 208